United States Patent
Westman et al.

(10) Patent No.: US 9,617,699 B2
(45) Date of Patent: Apr. 11, 2017

(54) LIGHTING SYSTEM FOR A SNOW PLOW

(71) Applicants: John Clark Westman, Baraga, MI (US); Jennifer M Westman, Baraga, MI (US)

(72) Inventors: John Clark Westman, Baraga, MI (US); Jennifer M Westman, Baraga, MI (US)

(*) Notice: Subject to any disclaimer, the term of this patent is extended or adjusted under 35 U.S.C. 154(b) by 0 days.

(21) Appl. No.: 15/140,425

(22) Filed: Apr. 27, 2016

(65) Prior Publication Data
US 2016/0319503 A1    Nov. 3, 2016

Related U.S. Application Data

(60) Provisional application No. 62/153,547, filed on Apr. 28, 2015.

(51) Int. Cl.
*E01H 5/06*    (2006.01)
*B60Q 1/26*    (2006.01)
*B60Q 5/00*    (2006.01)

(52) U.S. Cl.
CPC ........... *E01H 5/066* (2013.01); *B60Q 1/2661* (2013.01); *B60Q 5/00* (2013.01); *E01H 5/061* (2013.01)

(58) Field of Classification Search
CPC .......... E01H 5/066; E01H 5/065; B60Q 1/18; B60Q 1/2661
See application file for complete search history.

(56) References Cited

U.S. PATENT DOCUMENTS

| | | | |
|---|---|---|---|
| 2011/0175719 A1* | 7/2011 | Ford | B60Q 1/2611 340/473 |
| 2014/0009953 A1* | 1/2014 | Ono | F21S 48/22 362/520 |
| 2014/0078762 A1* | 3/2014 | Adams | F21S 48/1104 362/496 |

* cited by examiner

*Primary Examiner* — Curtis Odom
(74) *Attorney, Agent, or Firm* — Justin Lampel (57) ABSTRACT

A lighting system for a snow plow is provided. The lighting system has a plurality of lights positioned on numerous light strips. The lighting system may have a first lighting strip and a second lighting strip. While the first lighting strip may be stationary, the second lighting strip may have a first unit and a second unit wherein the first unit remains stationary and wherein the second unit moves with respect to the first unit so as to allow the user to properly direct the light emitted from the second light strip. The lighting strips are slightly flexible so as to allow installment on any curved surfaces of the snow plow and may have a plurality of arched-shaped or wedged-shaped grooves which may be used in any combination at the same time in the system and which act as creases for bending the strips.

10 Claims, 7 Drawing Sheets

LIGHTING SYSTEM FOR A SNOW PLOW

CROSS REFERENCE TO RELATED APPLICATIONS

The following application is based on U.S. provisional application Ser. No. 62/153,547 filed on Apr. 28, 2015 the entire contents of which are incorporated by reference.

BACKGROUND OF THE INVENTION

A lighting system for a snow plow is provided. The lighting system has a plurality of lights positioned on numerous light strips. The lighting system may have a first lighting strip and a second lighting strip. While the first lighting strip may be stationary, the second lighting strip may have a first unit and a second unit wherein the first unit remains stationary and wherein the second unit moves with respect to the first unit so as to allow the user to properly direct the light emitted from the second light strip. In one embodiment, environmentally friendly LED lights are utilized on the first lighting strip and the second lighting strip. The lighting strips are slightly flexible so as to allow installment on any curved surfaces of the snow plow and may have a plurality of arched-shaped or wedged-shaped grooves which may be used in any combination at the same time in the system and which act as creases for bending the strips. A securing strip may allow the first lighting strip and second lighting strip to be positioned at various locations on the snow plow.

Over the years, attempts have been made to provide lights for snow removal apparatuses. For example, U.S. Pat. No. 8,068,961 to Manze discloses a headlight control system for use on a snow removal apparatus mounted on the front of a vehicle and a related method are disclosed that automatically, selectively illuminate the headlights of the vehicle in addition to the headlights of the snow removal apparatus only when the snow removal apparatus blade is in a down position such that it is not physically obstructing the headlights of the vehicle. The headlight control system and method only operate to turn on the vehicle headlights when the snow removal apparatus lights are turned on. The headlight control system and method are capable of operating both the low beam headlights and the high beam headlights of the vehicle in conjunction with the low beam headlights and the high beam headlights of the snow removal apparatus when the snow removal apparatus blade is lowered.

Further, U.S. Pat. No. 7,137,724 also to Manze discloses auxiliary lighting systems for use with snow plow and like front-mounted vehicle accessories is disclosed which facilitates the interconnection of such auxiliary lighting systems to the lighting system of a vehicle upon which the vehicle accessory is mounted to provide power to and to control the auxiliary lights with the lighting system of the vehicle. The independent lighting system provides first and second harness portions for respective installation on the vehicle and the vehicle accessory, with the first harness portion having a first configuration when it is not connected to the second harness portion and a second configuration when it is connected to the second harness portion. The first configuration allows the headlights on the vehicle top operate, while the second configuration allows only the headlights on the vehicle accessory to operate, with changes between the first and second configurations being accomplished without the need for a switch or a relay.

Still further, U.S. Pat. No. 6,273,729 to Kelly discloses an auxiliary vehicle light harness which has a headlight connector to connect to a headlight, a power connector to connect to a headlight plug, an auxiliary light connector to connect to an auxiliary light, and a switch to control power to the headlight and/or the auxiliary light. The harness may include a control module to direct power to the auxiliary light and/or the headlight upon receiving a signal from the switch. The harness may further include a seal to protect the harness circuit from developing a short.

However, these patents fail to describe a lighting system for a snow removal apparatus which is easy to use and efficient. Further, these patents fail to describe a lighting system which has a first non-adjustable unit and a second adjustable unit.

SUMMARY OF THE INVENTION

A lighting system for a snow plow is provided. The lighting system has a plurality of lights positioned on numerous light strips. The lighting system may have a first lighting strip and a second lighting strip. While the first lighting strip may be stationary, the second lighting strip may have a first unit and a second unit wherein the first unit remains stationary and wherein the second unit moves with respect to the first unit so as to allow the user to properly direct the light emitted from the second light strip. In one embodiment, environmentally friendly LED lights are utilized on the first lighting strip and the second lighting strip. The lighting strips are slightly flexible so as to allow installment on any curved surfaces of the snow plow and may have a plurality of arched-shaped or wedged-shaped grooves which may be used in any combination at the same time in the system and which act as creases for bending the strips. A securing strip may allow the first lighting strip and second lighting strip to be positioned at various locations on the snow plow.

An advantage of the present lighting system for a snow plow is that the present system may have various colored and/or clear lights to draw attention to the snow plow so as to increase safety. Further, in an embodiment, the lights may be intermingled within a single string or a set of strips to blink at a specific pattern.

An additional advantage of the present lighting system for a snow plow is that the present system may utilize environmentally friendly LED lights.

Another advantage of the present lighting system for a snow plow is that the present snow plow lighting system may have a first lighting strip and a second lighting strip wherein the first lighting strip remains stationary and wherein a user may electively position the second lighting strip so as to control the direction of the light emitted from the second lighting strip.

Additionally another advantage of the present lighting system for a snow plow is that the present lighting system may be controlled by a user inside the snow plow or outside the snow plow.

Yet another advantage of the present lighting system for a snow plow is that the present lighting system may increase the visibility of the snow plow.

Still another advantage of the present lighting system is that the present lighting system may be used on snow plow of various sizes and may be used in connection with various snow plow blade configurations including, for example, a straight configuration snow blade, a v-shaped snow blade, an extended wing snow blade, etc.

In an embodiment, the device may have a built-in audio system which may increase awareness that the removal plow is in use for people who are visually impaired.

Furthermore another advantage of the present lighting system for a snow plow is that the present lighting system may be utilized on a first snow plows and later easily switched to an alternative snow plow.

Still another advantage of the present lighting system for a snow plow is that the present system allows the user to use the lighting system independently of the snow plow.

For a more complete understanding of the above listed features and advantages of the present lighting system for a snow plow reference should be made to the illustrations provided. Further, additional features and advantages of the invention are described in, and will be apparent from, the detailed description of the preferred embodiments.

DETAILED DESCRIPTION OF THE PREFERRED EMBODIMENTS

A lighting system for a snow plow is provided. The lighting system has a plurality of lights positioned on numerous light strips. The lighting system may have a first lighting strip and a second lighting strip. While the first lighting strip may be stationary, the second lighting strip may have a first unit and a second unit wherein the first unit remains stationary and wherein the second unit moves with respect to the first unit so as to allow the user to properly direct the light emitted from the second light strip. In one embodiment, environmentally friendly LED lights are utilized on the first lighting strip and the second lighting strip. The lighting strips are slightly flexible so as to allow installment on any curved surfaces of the snow plow and may have a plurality of arched-shaped or wedged-shaped grooves which may be used in any combination at the same time in the system and which act as creases for bending the strips. A securing strip may allow the first lighting strip and second lighting strip to be positioned at various locations on the snow plow.

Figures 10, 11, 12:
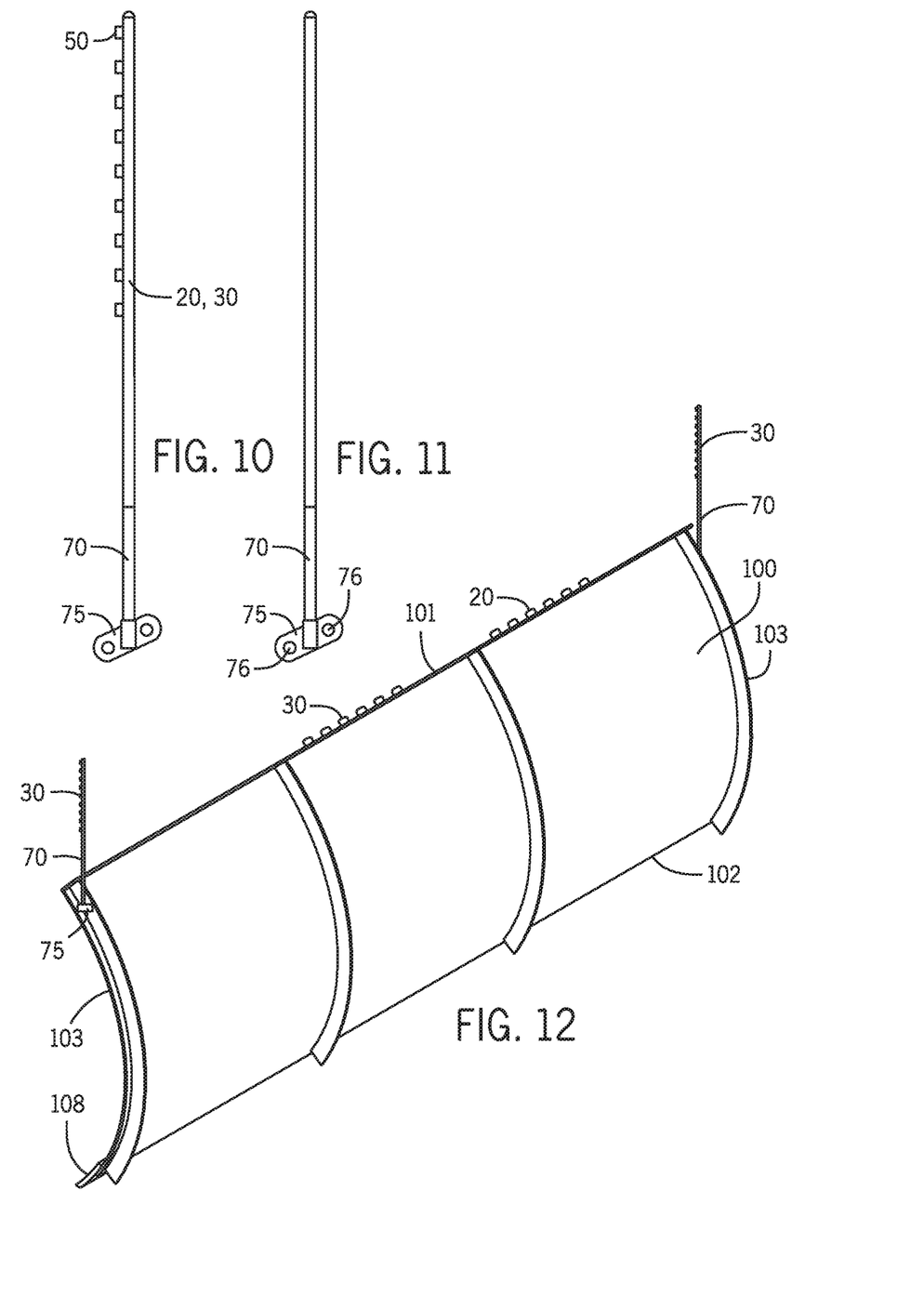
FIG. 10 illustrates a side view of the first or second lighting strip secured to a guide flag of the snow plow.
FIG. 11 illustrates a side view of the guide flag of the snow plow.
FIG. 12 illustrates a perspective view of a second lighting strip secured to guide flag of the plow and a first lighting strip secured to the blade of the snow plow.
Figure 13:
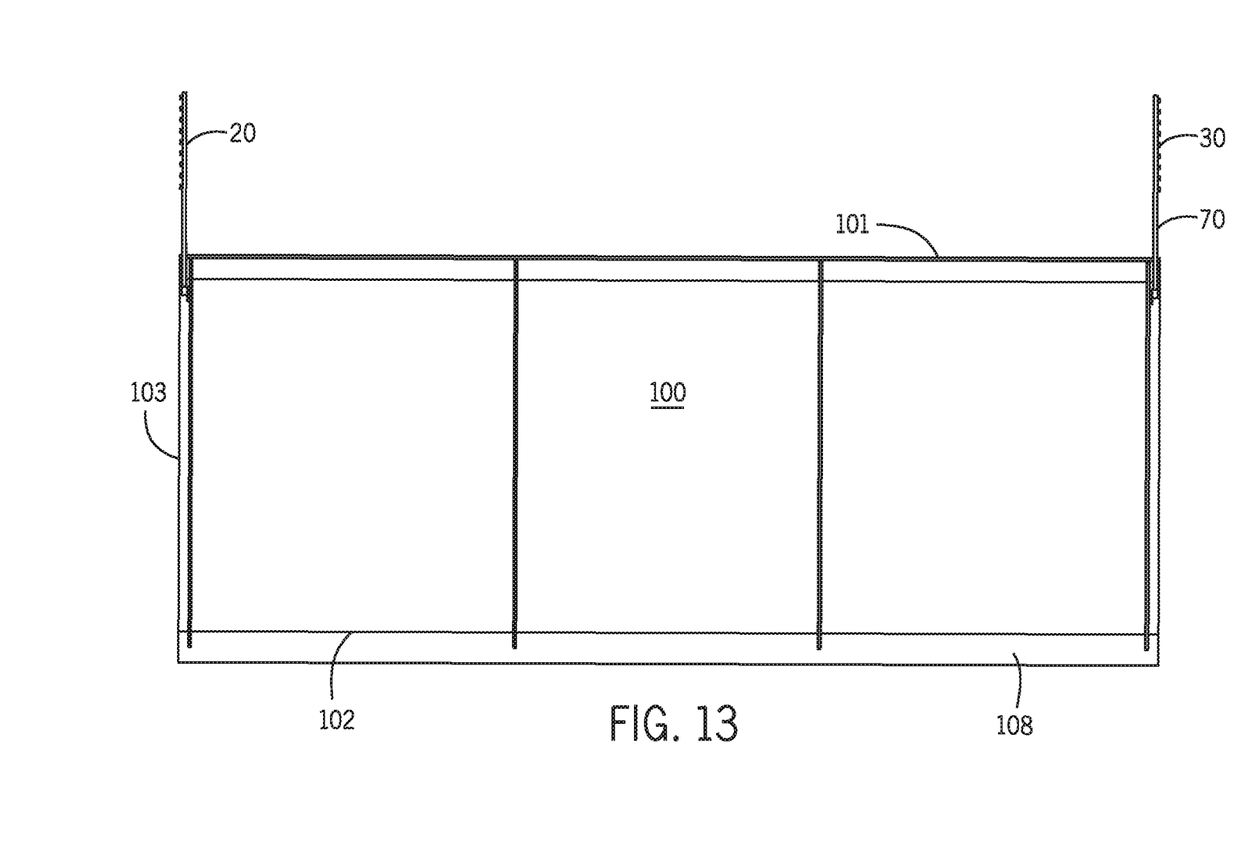
FIG. 13 illustrates a front view of both the first and the second lighting strip secured to guide flags which are secured to a blade of the snow plow.
Figure 14:
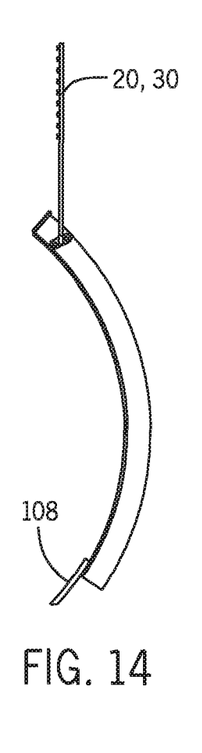
FIG. 14 illustrates a side view of the first or second lighting strip secured to a guide flag of the blade of the snow plow.
Figure 15:
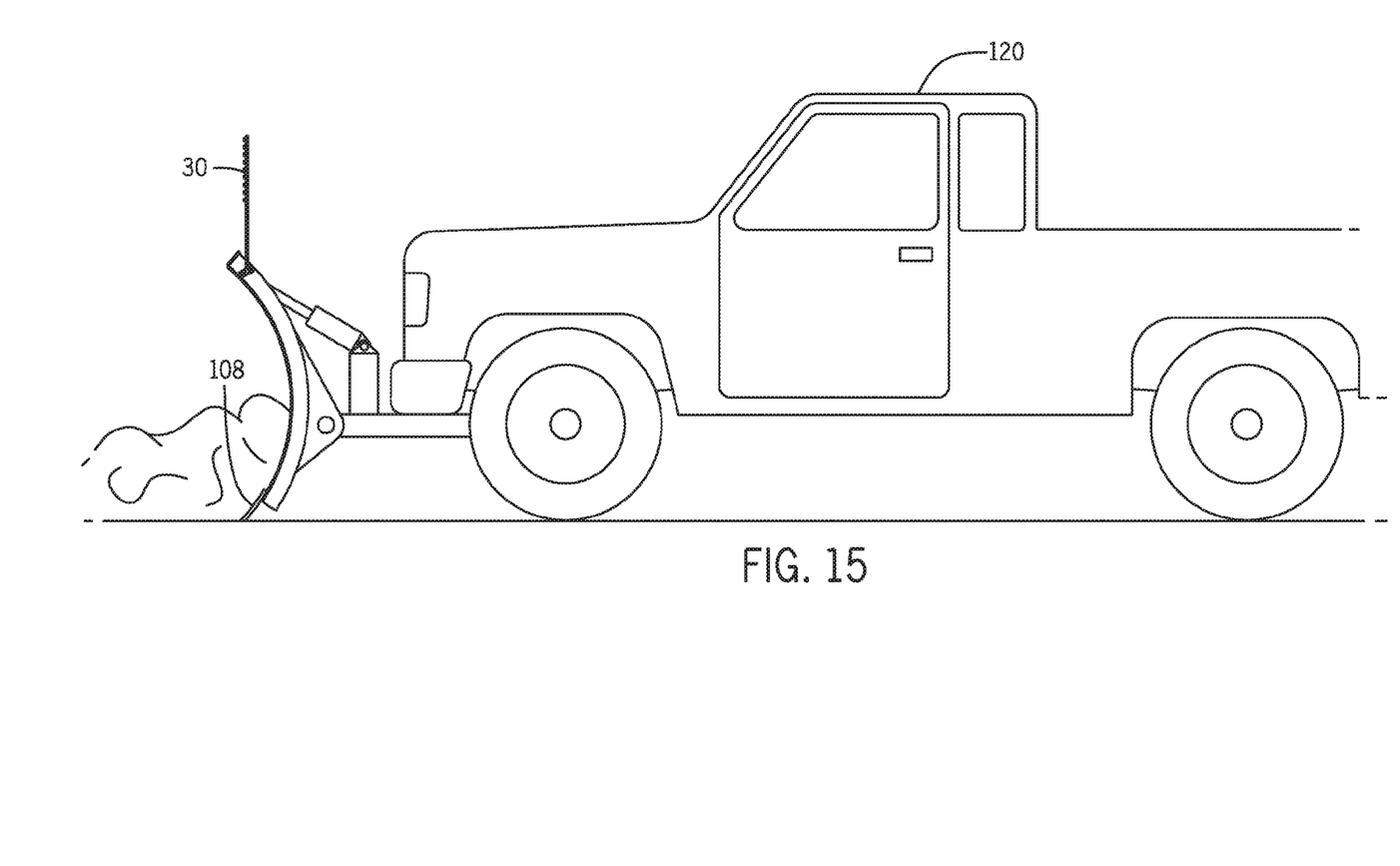
FIG. 15 illustrates a side view of the second lighting strip secured to a blade of the snow plow.

Referring first to FIGS. 12 and 15, in an embodiment, a lighting system 1 for a snow plow 120 is provided. The lighting system 1 may be secured to either or both the blade 100 of the snow plow 120 or the main vehicle itself. The blade 100 of the snow plow 120 may have a top 101 (FIG. 7), a bottom 102 and a side 103. In an embodiment the bottom 102 of the blade 100 of the snow plow 120 may have an extended blade 108 wherein the extended blade 108 makes contact with the street. The lighting system 1 may have a first lighting strip 20 (FIG. 4) and a second lighting strip 30 (FIG. 1) wherein the first lighting strip 20 and the second lighting strip 30 may each have a plurality of lights 50. In one embodiment, the lights 50 are located within an interior (FIG. 6) of the first lighting strip 20 and the second lighting strip 30 whereas in a second embodiment, the lights 50 are located on top of the strips. More specifically, the plurality of lights 50 may be located beneath a transparent layer 77 of the first lighting strip 20 or the second lighting strip 30. As a result, the plurality of lights 50 may be protected from the environment.

In an embodiment, the first lighting strip 20 may not be adjustable while the second lighting strip 30 may be adjustable (as described below). Further, in an alternative embodiment, the plurality of lights 50 may be energy conservative LED lights. In an embodiment selected by the user, the LED lights may be of various colors and brightness and may even flash to increase visibility. Further, in an embodiment, the colored lights may be intermingled within a single string or a set of strings to a specific pattern.

In an embodiment, the first lighting strip 20 and the second lighting strip 30 may be largely comprised of urethane or non-metallic elastomeric components which allows for the first lighting strip 20 and/or second lighting strip 30 to be temporarily displaced multi-axially, while returning back to its original orientation. In addition, the first lighting strip 20 and/or the second lighting strip 30 may include an encapsulated magnet system 90 to aid in returning and maintaining the original position during operation.

Figure 4:
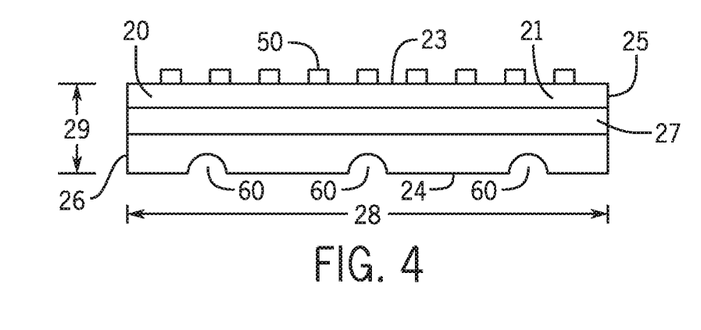
FIG. 4 illustrates a flat view of the top of the first lighting strip.
Figure 5:
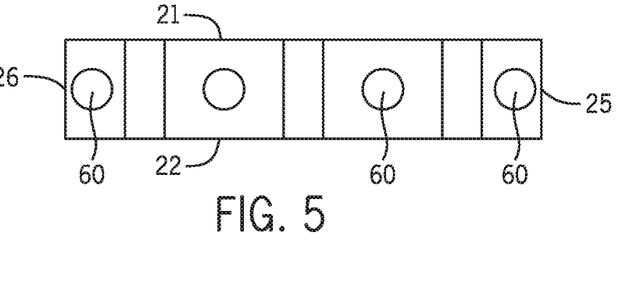
FIG. 5 illustrates a flat view of the back of the first lighting strip.

Referring now to FIG. 4, a top 21 of the first lighting strip 20 is illustrated. The first lighting strip 20 may have a housing having a top 21, a bottom 22 (FIG. 5), a front 23, a back 24, a first side 25, a second side 26 and, in an embodiment, a hollow interior channel 27. The first lighting strip 20 may further have a length 28 and a width 29. The length 28 may define the distance from the first side 25 to the second side 26 of the first lighting strip 20. Located on at least the front 23 of the first lighting strip 20 may be the plurality of lights 50. In use on a single snow plow, numerous first lighting strips 20 and/or numerous second lighting strips 30 may be implemented. In particular, the user may secure, for example, a plurality of first lighting strips 20 along the blade 100 of the snow plow 120 and a plurality of second lighting strips 30 along, for example, guide flags 70 (FIGS. 10 and 11) of the snow plow 120.

In an embodiment, the housing of the first lighting strip 20 may be made from, from example, a durable plastic, metal, rubber or the like. Preferably, the housing of the first lighting strip 20 is slightly flexible so as to allow the first lighting strip 20 to be bent slightly along, for example, the curved front of the blade 100 of the snow plow 120 but not too flexible so as to not be strong enough to be durable in extreme weather conditions.

In an embodiment, the back 24 of the first lighting strip 20 (which is generally flexible) may have a plurality of arched-shaped (or "wedged-shaped") grooves 60. The plurality of arched-shaped grooves 60 may allow the first lighting strip 20 to be bent along, for example, the front of the blade 100 of the snow plow 120. In particular, as the first lighting strip 20 is bent, for example, forward toward the front 23 or bent backward toward the back 24 (depending on which direction the user wishes to direct the light) the plurality of arched-shaped grooves 60 act as a crease making the bending of the first lighting strip 20 easier as a result of the first lighting strip 20 being somewhat rigid. Further, in an embodiment, the arched-shaped grooves 60 may also allow water which may normally be trapped between the light and frame to escape.

Figure 1:
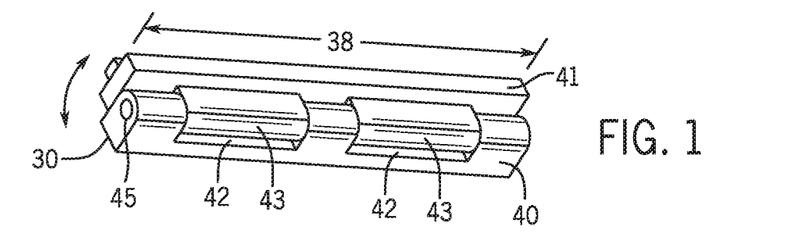
FIG. 1 illustrates a perspective view of the second lighting strip of the present system wherein a second unit of the second lighting strip is rotated away from the viewer.
Figure 2:
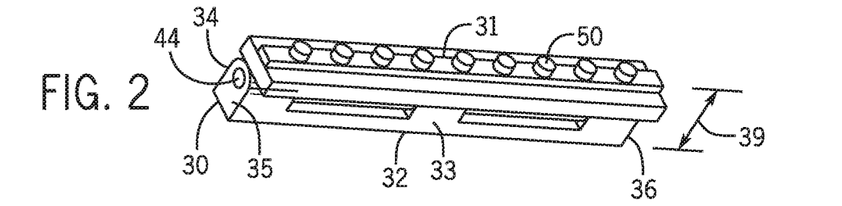
FIG. 2 illustrates a perspective view of the second lighting strip wherein the second unit of the second lighting strip is rotated directly upward.
Figure 3:
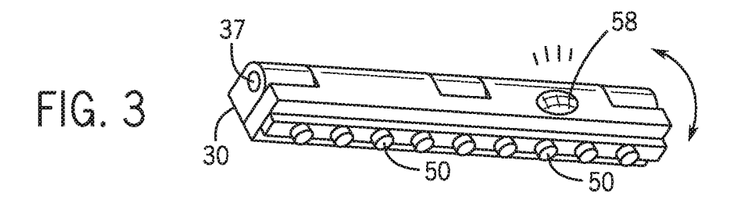
FIG. 3 illustrates a perspective view of the second lighting strip wherein the second unit of the second lighting strip is rotated toward the viewer.

Referring now to FIGS. 1-3, the second lighting strip 30 is illustrated. The second lighting strip 30 may have a top 31, a bottom 32, a front 33, a back 34, a first side 35, a second side 36 and an interior channel 37. The second lighting strip 30 may further have a length 38 and a width 39. The length 38 may define the distance of the top 31 of the second lighting strip 30 (from the first side 35 to the second side 36). In an embodiment, the second lighting strip 30 may be comprised of a first unit 40 and a second unit 41. In an embodiment, the second unit 41 may move with respect to the first unit 40. In particular, the first unit 40 may have a plurality of elongated open spaces 42 for receiving a cylindrical portion 43 of the second unit 41. A generally cylindrical rod 45 may be inserted through the interior channel 37 of both the cylindrical portion 43 of the second unit 41 and also through the interior channel 37 of the first unit 40 such that the generally cylindrical rod 45 may act as a hinge allowing the second unit 41 to move with respect with the first unit 40 (the stationary unit 40). Further, in an embodiment, a mounting base may also be rotatable in order to either remain perpendicular automatically, or be adjusted manually by the operator. Finally, in an embodiment, an end cap 44 may be placed over the generally cylindrical rod 45 to lock the generally cylindrical rod 45 into place.

In an embodiment, the first unit 40 of the second lighting strip 30 may be stationary while the second unit 41 of the second lighting system 30 moves with respect to the first unit 40. FIG. 1 illustrates a stationary first unit 40 while the second unit 41 is rotated away from the viewer. FIG. 2 illustrates the first unit 40 remaining stationary while the second unit 41 is rotated to a directly upward orientation. FIG. 3 illustrates the stationary first unit 40 while the second unit 41 is rotated toward the viewer. The second unit 41 of the second lighting strip 30 may be rotated and setup to provide the maximum illumination and direction desired by the operator of the snow plow 120. In an embodiment, the second unit 41 may rotate approximately one hundred and eighty degrees with respect to the stationary first unit 40.

Because the plurality of lights 50 are located on the second unit 41, allowing the second unit 41 to rotate with respect to the first unit 40 allows the user to selectively control which direction the light from the plurality of lights 50 is emitted. For example, a user may decide that two out of every three second lighting strips 30 should be facing forward providing additional light toward the road while one-third of the second lighting strips 30 faces back toward the driver. As road conditions alter or the preference of the driver alters, the driver may electively alter which of the second lighting strips 30 face forward or backward. In an embodiment, the second unit 41 of the second lighting strips 30 may be manually controlled by a person outside of the snow plow 120 or the second unit 41 may be manually or automatically controlled by an electrical system (not illustrated) located within the cabin of the snow plow 120.

Referring now to FIGS. 10 and 11, in an embodiment, the first lighting unit 20 and/or the second lighting unit 30 may be secured to a guide flag 70 having a bracket 75 for securing the same to the snow plow 120. In particular, the bracket 75 may incorporate a plurality of openings 76 for receiving a screw(s) which secures the bracket 75 to the snow plow 120. In an embodiment, the guide flag 70 may be partially inserted through the interior channel 27 of the first lighting strip 20 so as to secure the first lighting strip 20 to the guide flag 70 (as discussed below).

Figure 6:
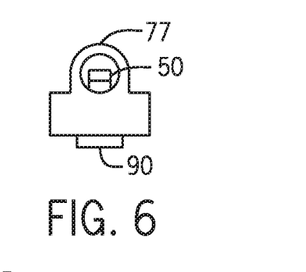
FIG. 6 illustrates a flat view of the side of the first lighting strip.
Figure 7:
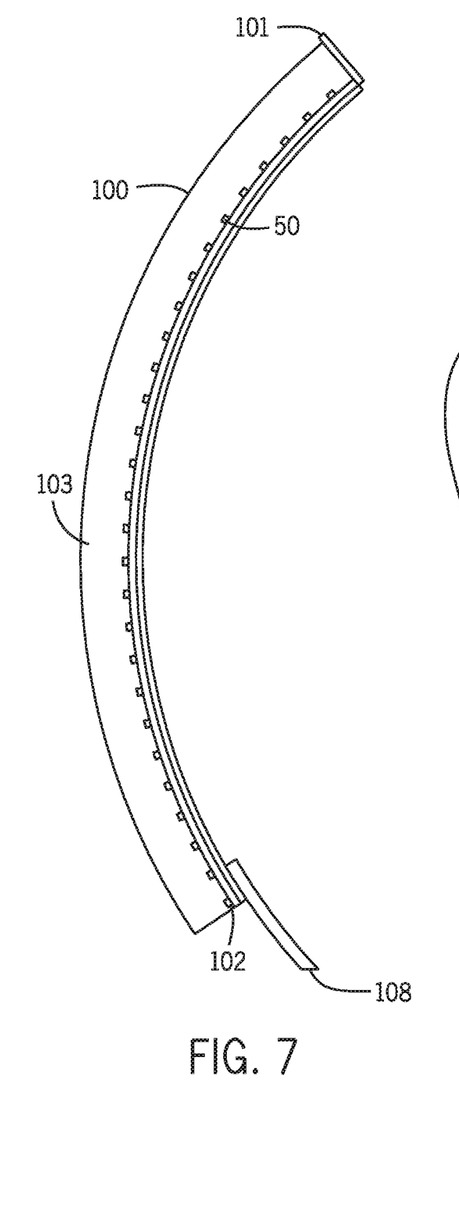
FIG. 7 illustrates a flat view of the side of a blade of the snow plow wherein the first lighting strip is secured to the blade of the snow plow.
Figure 8:
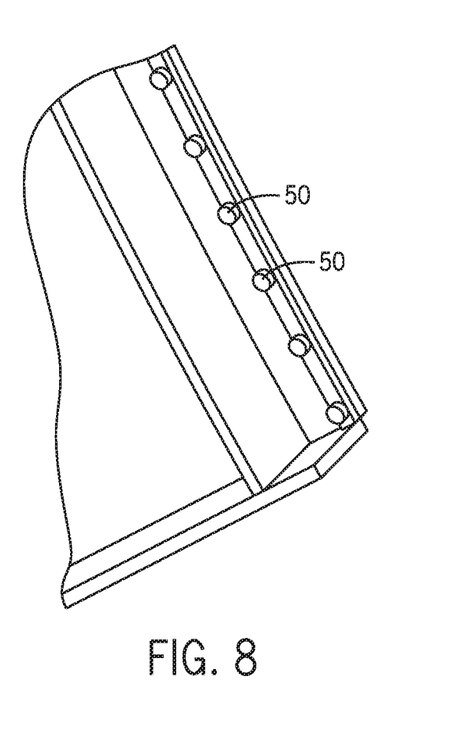
FIG. 8 illustrates a close-up of the first lighting strip located on a corner of the blade of the snow plow.
Figure 9:
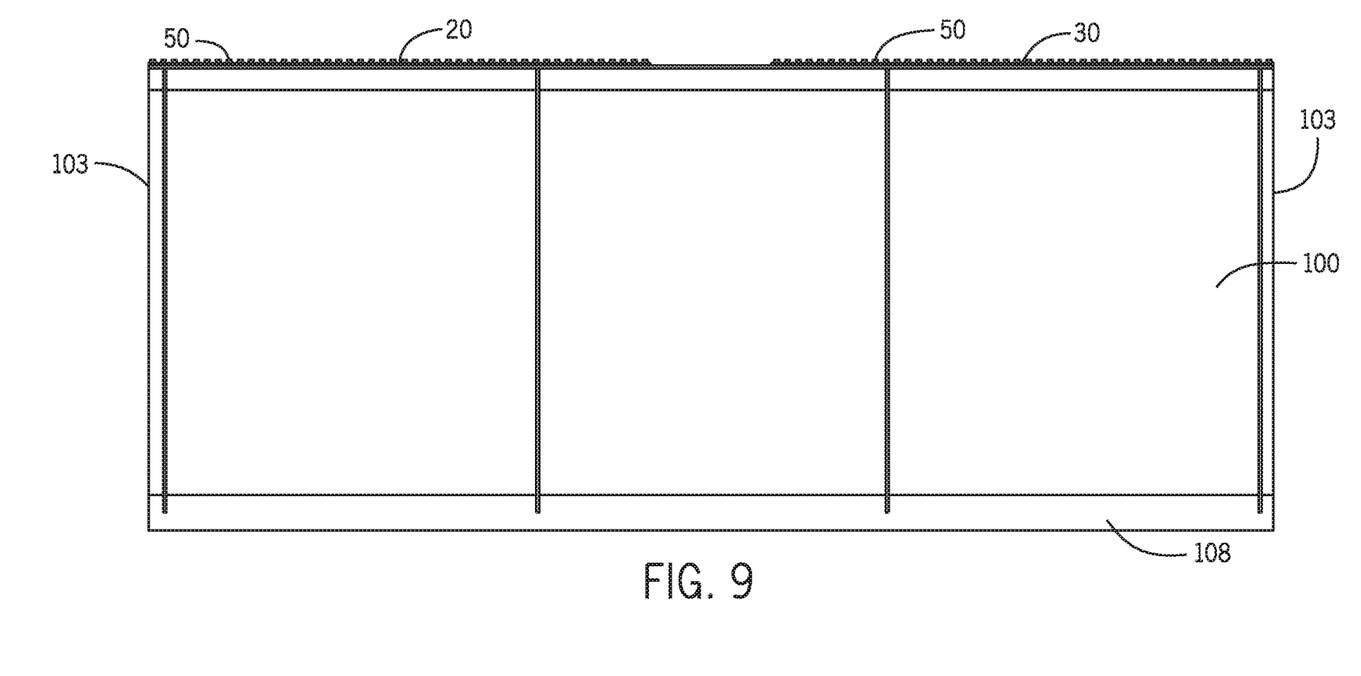
FIG. 9 illustrates a front view of the blade of the snow plow wherein the first lighting strip is secured to the top of the blade of the snow plow.

In an embodiment, the first lighting strip 20 and/or the second lighting strip 30 may have a plurality of strong magnets 90 (FIG. 6). In this embodiment, the magnets 60 may allow the user to selectively place the first lighting strip 20 and/or the second lighting strip 30 at various locations on metal portions of the snow plow 120 without the need to screw or otherwise spend a great amount of time securing the device to the snow plow 120. As a result, in the embodiment with the strong magnets 90, a user may very quickly add the first lighting strip 20 and/or the second lighting strip 30 to the snow plow 120 in emergency conditions.

Figure 16:
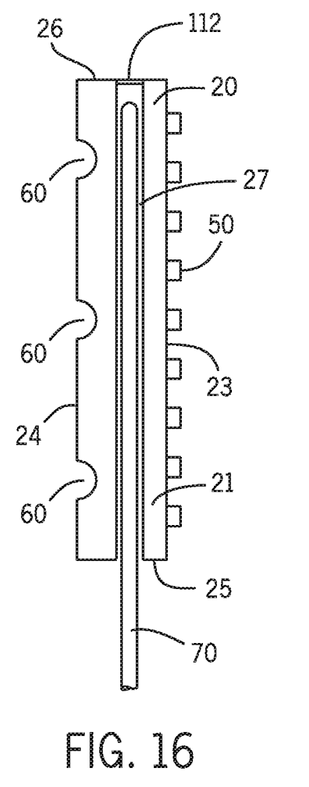
FIG. 16 illustrates an embodiment wherein the first lighting strip is placed over a guide flag of the snow plow.

Referring now to FIG. 16, as stated above, in an embodiment, the first lighting strip 20 may be placed over the guide flag 70. In particular, in this embodiment, the first lighting strip 20 may be open on the first side 25, and sealed at the second side 26 with a cap 112. As a result, a user may simply place the first lighting strip 20 over the guide flag 70 and allow the first lighting strip to remain secured to the guide flag 70 by, for example, both gravity and/or the magnet 90. Accordingly, the interior channel 27 of the first lighting strip 20 has a greater diameter than the diameter of the guide flag 70.

Figure 17:
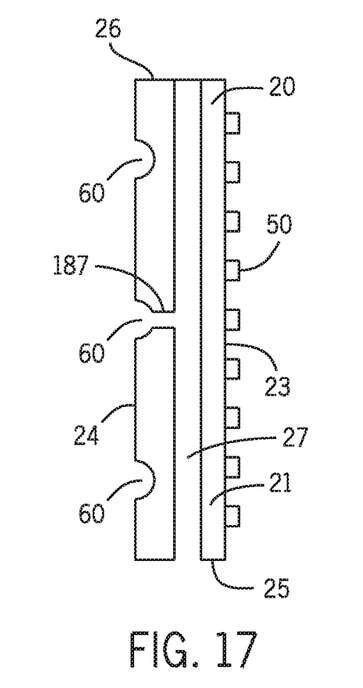
FIG. 17 illustrates an alternative embodiment wherein the first lighting strip has an opening channel for releasing water which may accumulate within the interior of the first lighting strip.

Referring now to FIG. 17, in an embodiment, the first lighting strip 20 (or the second lighting strip 30) may have a channel 187 which runs from the interior channel 27 of the first lighting strip 20 to the arched-shaped grooves 60. The channel 187 may allow water or ice which may otherwise accumulate within the interior 27 of the first lighting strip 20 to exit through the arched-shaped grooves 60 so as to increase the flexibility of the lighting strip 20.

Finally, in an embodiment as illustrated in FIG. 3, the first lighting strip 20 or the second lighting strip 30 may have a speaker 58 wherein an audible sound may be produced. As a result, the first lighting strip 20 and the second lighting strip 30 may further increase safety to pedestrians who might otherwise have difficulty seeing the snow plow 120.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

We claim:

1. A lighting system for a vehicle comprising:
   a first unit having a first side, a second side, a top surface, a bottom surface, a front, a back and an opening forming a hollow channel running from the first side of the first unit to the second side of the first unit wherein the hollow channel passes through at least one elongated open space of the first unit,
   a second unit having a first end, a second end, a top surface, a bottom surface, a front, a back and a hollow channel extending through the bottom surface of the second unit,
   wherein the first unit is stationary and wherein the second unit rotates with respect to the first unit;
   a rod extending through the hollow channel of the first unit and the hollow channel of the second unit wherein the rod allows the second unit to rotate with respect to the first unit; and
   at least one light located on the top surface of the second unit.

2. The lighting system for a vehicle of claim 1 wherein the second unit rotates up to one hundred and eighty degrees with respect to the first unit.

3. The lighting system for a vehicle of claim 1 further comprising:
   a magnet located on the bottom surface of the first unit wherein the magnet is capable of being secured to a metal of the vehicle.

4. The lighting system for a vehicle of claim 1 wherein the first unit and second unit are flexible.

5. The lighting system for a vehicle of claim 1 wherein the light may be displayed in various colors.

6. The lighting system for a vehicle of claim 1 wherein the light is an LED light.

7. The lighting system for a vehicle of claim 1 wherein the light flashes between on and off.

8. A lighting system for a vehicle comprising:
   a flexible housing unit having a top surface, a bottom surface, a front, a back, a first side and a second side;
   an interior of the flexible housing wherein the interior is capable of receiving a guide flag pole of a snow plow vehicle;
   an opening on the first side of the flexible housing for receiving the guide flag pole of a snow plow vehicle and wherein the second side lacks an opening;
   at least one light located on the top surface of the housing unit;
   at least one indentation portion on the bottom surface wherein the indentation portion is capable of allowing the housing unit to bend and further wherein a hollow channel running from an interior channel and out through the indentation portion wherein the hollow channel is capable of allowing ice and water to escape from the interior of the flexible housing and wherein the hollow channel is generally perpendicular to the indentation portion; and
   wherein the light is located on the opposing surface as the indentation.

9. A lighting system for a vehicle of claim 8 further comprising:
   a magnet located on the bottom surface wherein the magnet is capable of allowing the flexible housing unit to be temporarily secured to a metal surface of the vehicle.

10. The lighting system for a vehicle of claim 8 further comprising:
    a speaker located on the housing for producing an audible sound.

* * * * *